US011683367B2

(12) United States Patent
Pentakota

(10) Patent No.: US 11,683,367 B2
(45) Date of Patent: Jun. 20, 2023

(54) INDUSTRY EDGE SERVICES

(71) Applicant: MICROSOFT TECHNOLOGY LICENSING, LLC, Redmond, WA (US)

(72) Inventor: Hema Pentakota, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/491,479

(22) Filed: Sep. 30, 2021

(65) Prior Publication Data
US 2022/0417321 A1    Dec. 29, 2022

Related U.S. Application Data

(60) Provisional application No. 63/215,400, filed on Jun. 25, 2021.

(51) Int. Cl.
| | | |
|---|---|---|
| *H04L 67/1001* | (2022.01) | |
| *G06F 9/50* | (2006.01) | |
| *H04L 69/08* | (2022.01) | |
| *G06N 5/04* | (2023.01) | |
| *H04L 67/53* | (2022.01) | |
| *H04L 9/32* | (2006.01) | |

(52) U.S. Cl.
CPC .......... *H04L 67/1001* (2022.05); *G06F 9/505* (2013.01); *G06N 5/04* (2013.01); *H04L 9/3236* (2013.01); *H04L 67/53* (2022.05); *H04L 69/08* (2013.01)

(58) Field of Classification Search
CPC ............ H04L 63/0263; H04L 63/0442; H04L 9/3236; H04L 9/3226; H04L 9/30
See application file for complete search history.

(56) References Cited

U.S. PATENT DOCUMENTS

| | | | |
|---|---|---|---|
| 2019/0281132 A1 | 9/2019 | Sethuraman et al. | |
| 2021/0144517 A1* | 5/2021 | Guim Bernat | ........ H04W 12/04 |
| 2021/0168125 A1* | 6/2021 | Vemulpali | ............. H04L 9/3236 |

FOREIGN PATENT DOCUMENTS

| | | |
|---|---|---|
| CN | 112866096 A | 5/2021 |
| WO | 2019157955 A1 | 8/2019 |

OTHER PUBLICATIONS

"International Search Report and Written Opinion Issued in PCT Patent Application No. PCT/US22/030983", dated Sep. 29, 2022, 14 Pages.

* cited by examiner

*Primary Examiner* — Barbara B Anyan
(74) *Attorney, Agent, or Firm* — Han Gim; Newport IP, LLC

(57) ABSTRACT

A computing environment includes a computing service provider and an edge computing network that has computing and storage devices that extend computing resources of the computing service provider to remote users. An edge platform is configured to execute industry specific PaaS services and industry specific third-party applications. The edge platform communicates with an IoT edge service, inference engine, and IoT edge gateway that performs protocol conversion. The industry edge platform provides a standardized platform for enabling execution of the industry specific PaaS services and industry specific third-party applications.

18 Claims, 12 Drawing Sheets

INDUSTRY EDGE SERVICES

PRIORITY APPLICATION

The present application is a non-provisional application of, and claims priority to, the earlier filed U.S. Provisional Application Ser. No. 63/215,400 filed on Jun. 25, 2021, the contents of the listed application are hereby incorporated by reference in their entirety.

BACKGROUND

A data center may house computer systems and various networking, storage, and other related components. Data centers may, for example, be used by service providers to provide computing services to businesses and individuals as a remote computing service or provide "software as a service" (e.g., cloud computing). Service providers may also utilize edge sites that may include a geographically distributed group of servers and other devices that work together to provide efficient delivery of content to end-users of data center services, with the goal being to provide services with high availability and improved latencies. In some cases, some users such as enterprises may wish to use of some of their computing or storage assets on their own premises, or install resources from the service provider on their premises, while taking advantage of the cloud computing capabilities of the data center. However, the incorporation of such assets into the data center's networks may raise a number of issues.

It is with respect to these considerations and others that the disclosure made herein is presented.

SUMMARY

In some scenarios, users of a remote computing service such as a cloud computing service may be provided the option of continuing to use such services while installing some of the computing and storage resources of the remote computing service at the users' location ("on-premises"). The users may continue to benefit from the remote computing services, while incorporating aspects of the services into the users' premises. However, today there are no hybrid industry solutions available to enterprises. Enterprises typically have siloed and customized solutions deployed within enterprise premises and solutions in the cloud. The present disclosure enables such integration of services between the remote computing service and the user-located resources, while maintaining a seamless user experience as was provided entirely via the remote computing service. Systems and methods are disclosed herein that enable hybrid solutions for industries by providing a consistent technology platform in the cloud and within enterprise premises. This enables enterprises to leverage cloud flexibility and enable faster digital transformation leveraging Industry 4.0, 4G/5G, and Multi-access Edge Computing (MEC).

The described techniques thus allow for improved access and use of resources while maintaining efficient use of computing resources such as processor cycles, memory, network bandwidth, and power. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
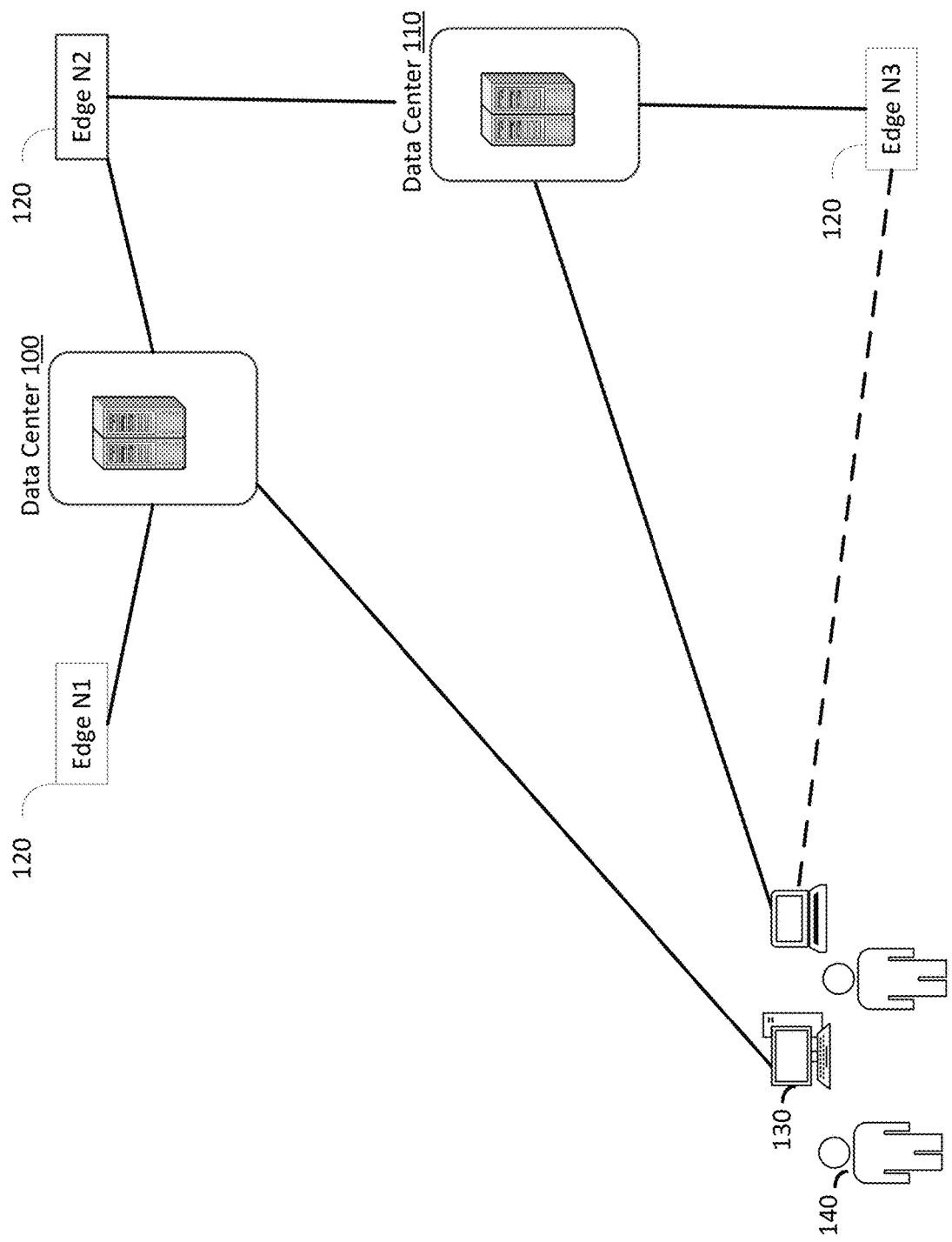
FIG. 1 is a diagram illustrating an example architecture in accordance with the present disclosure.

Users of a computing service such as a cloud computing service may be provided use of such services via computing and storage resources of the computing service via a remote location ("edge site"). The users may continue to benefit from the computing services, while aspects of the services may be incorporated into the edge sites. Edge sites enable a data center to extend cloud services to local deployments using a distributed architecture that enables federated options for local and remote data and control management. It is desirable to provide the highest level of computing availability to users at their location, on premises, or via an edge site while at the same time providing performance and minimizing cost.

The disclosed industry edge service with edge sites can enable industry and enterprise users to deploy their cloud-based footprints closer to or on their premises, thereby extending the reach of the cloud computing service to the user premises. For example, an enterprise user may want to deploy some remote computing service capabilities to their on-site production environment or execute virtual machines and run workloads on hardware located on-premise. In some embodiments, the cloud provider may provide a consistent and standardized edge platform for use near or at the user premises. Such an edge platform may be referred to herein as an industry edge platform or industry edge service.

The industry edge platform may conform to requirements established by the cloud service provider. In some embodiments, the hardware may be provided by the cloud service provider. The cloud service provider may establish compatibility requirements for all hardware that is integrated into service provider's network. By providing such an industry edge platform, the cloud service provider may allow for the cloud service platform to be moved to the edge in a way that is consistent and reusable. The industry edge platform may be configured to provide services at the user premises in a seamless manner and can facilitate migration of data and services to and from the cloud service provider. The industry edge platform may host at least a portion of edge zones of the cloud service provider. The industry edge platform may also host the service provider's software stack. In some embodiments, the industry edge platform may be owned and managed by the cloud service provider or outsourced by the cloud service provider to a third party.

In some embodiments, the industry edge platform may provide hosting of applications for operators and/or enterprises (public and private). The applications may be stored or hosted on the industry edge platform or at data centers of the cloud provider and can be managed and orchestrated to provide user access at edge sites by an application manager that can reside in the cloud.

The industry edge platform may utilize 4G/5G networks at those locations. The disclosed industry edge service may further enable faster roll out of services by the cloud service provider. The cloud service provider may provide overall management and may also provide security. The cloud service provider may provide centralized and seamless management of applications and content that are hosted at the service provider and orchestrated to the industry edge platform. This can enable a seamless user experience for enterprise users.

Referring to the appended drawings, in which like numerals represent like elements throughout the several FIGURES, aspects of various technologies for remote management of computing resources will be described. In the following detailed description, references are made to the accompanying drawings that form a part hereof, and which are shown by way of illustration specific configurations or examples.

The present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

Ultra-reliable low-latency communications are useful for extremely time-sensitive and mission-critical applications, such as remote factory automation and remote robotic surgery. 5G networks may enable a much greater density of transmitting and receiving devices, especially when sending small amounts of data. This can enable large-scale monitoring, measuring, and sensing applications in which large numbers of devices directly communicate with each other without human intervention—machine-to-machine communications (e.g., Internet of Things (IoT)). 5G networks can enable greater growth in the numbers of connected devices. Other features, depending on how networks are configured, can include edge computing, as discussed herein, in which the equivalents of current cloud computing capabilities are brought closer to wireless devices to enable more rapid processing, and network slicing, in which different customers, applications, or both can have their own virtual slices of a common physical network.

FIG. 1 illustrates one example where users of a data center in accordance with some embodiments. FIG. 1 illustrates data center 100 and 110 that are configured to provide computing resources to users 140 via user computers 130. The computing resources provided by data centers 100 and 110 may be cached or replicated at edge nodes 120. The computing resources provided by the data centers 100 and 110 and edge nodes 120 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

It should be appreciated that although the embodiments disclosed above are discussed in the context of virtual machines, other types of implementations can be utilized with the concepts and technologies disclosed herein. It should be also appreciated that the network topology illustrated in FIG. 1 has been greatly simplified and that many more networks and networking devices may be utilized to interconnect the various computing systems disclosed herein. These network topologies and devices should be apparent to those skilled in the art.

Figure 2A:
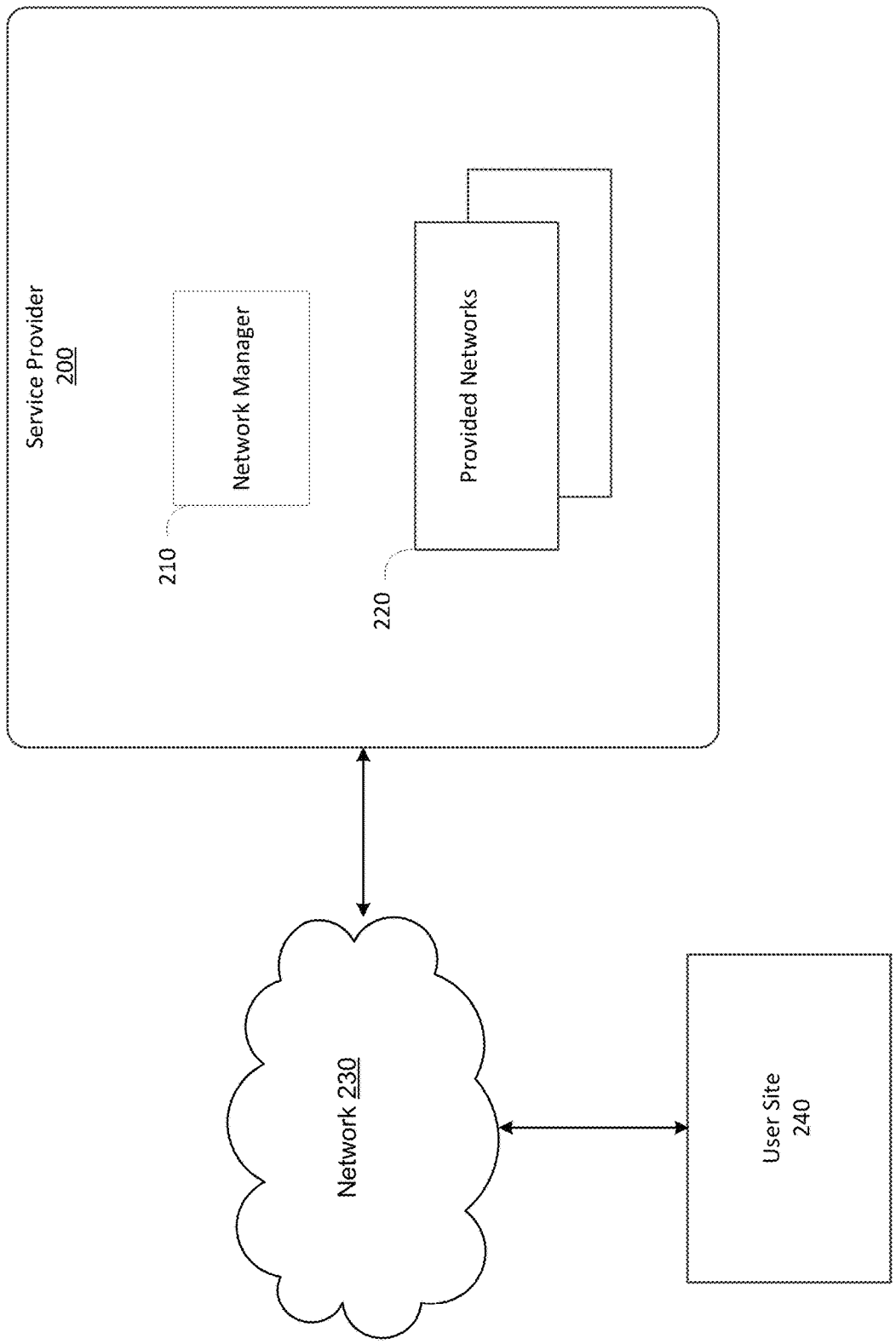
FIG. 2A is a diagram illustrating an example architecture in accordance with the present disclosure.

FIG. 2A illustrates an example computing environment in which the embodiments described herein may be implemented. FIG. 2A illustrates a service provider 200 that is configured to provide computing resources to users at user site 240. The user site 240 may have user computers that may access services provided by service provider 200 via a network 230. The computing resources provided by the service provider 200 may include various types of resources, such as computing resources, data storage resources, data communication resources, and the like. For example, computing resources may be available as virtual machines. The virtual machines may be configured to execute applications, including Web servers, application servers, media servers, database servers, and the like. Data storage resources may include file storage devices, block storage devices, and the like. Networking resources may include virtual networking, software load balancer, and the like.

Service provider 200 may have various computing resources including servers, routers, and other devices that may provide remotely accessible computing and network resources using, for example, virtual machines. Other resources that may be provided include data storage resources. Service provider 200 may also execute functions that manage and control allocation of network resources, such as a network manager 220.

Network 230 may, for example, be a publicly accessible network of linked networks and may be operated by various entities, such as the Internet. In other embodiments, network 230 may be a private network, such as a dedicated network that is wholly or partially inaccessible to the public. Network 230 may provide access to computers and other devices at the user site 240.

Figure 2B:
FIG. 2B is a diagram illustrating an example architecture in accordance with the present disclosure.

FIG. 2B illustrates an example computing environment in which the embodiments described herein may be implemented. FIG. 2B illustrates that an edge site 250 may be implemented to extend the physical reach of service provider 200 to provide localized computing resources to users at user site 240 using provided networks 260. The computing resources provided by the edge site 250 may include some or all of the various types of resources provided by service provider 200. The resources at edge site 250 may be under the control of service provider 200.

Figure 3:
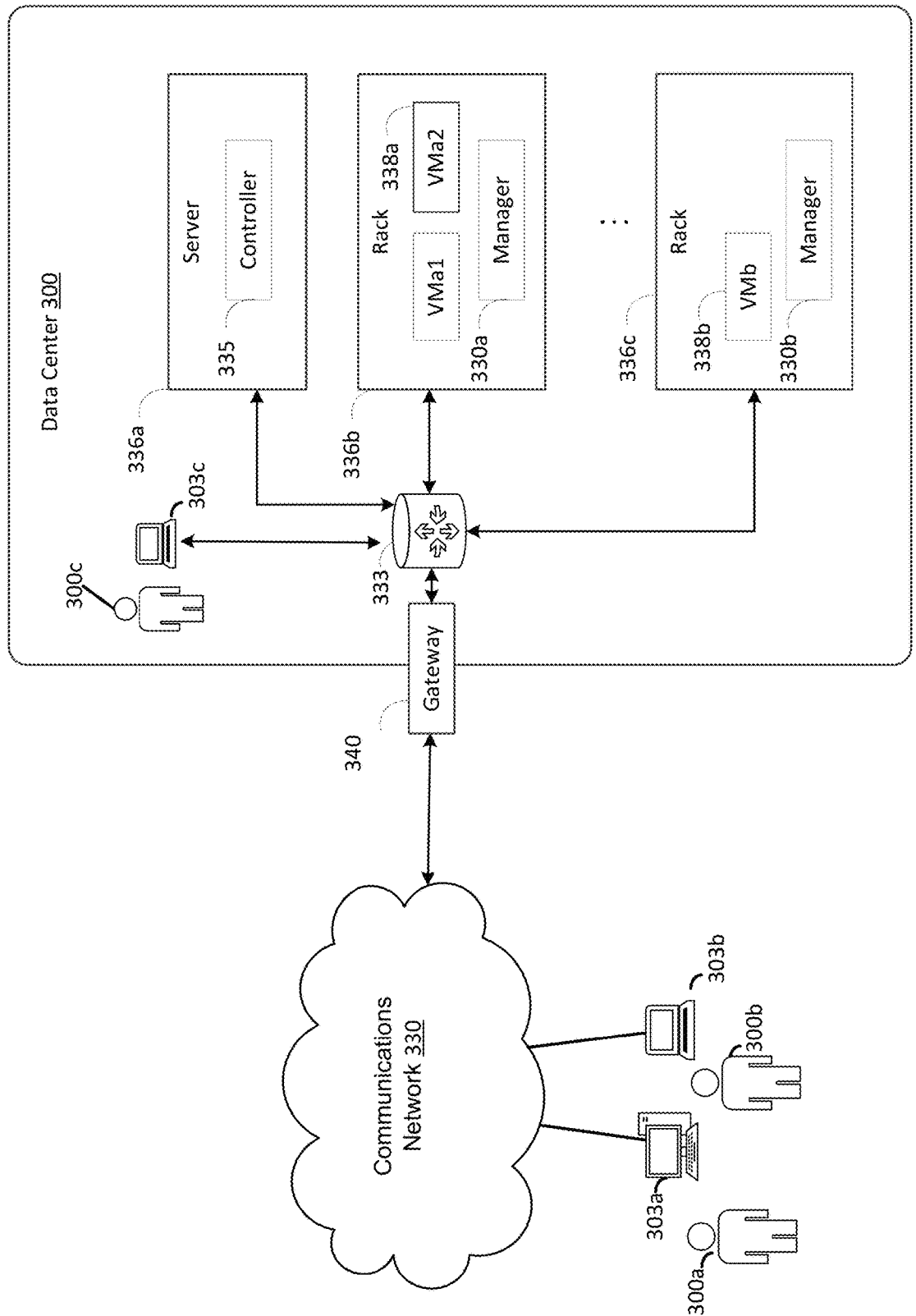
FIG. 3 is a diagram illustrating a data center in accordance with the present disclosure.

FIG. 3 illustrates an example computing environment in which the embodiments described herein may be implemented. FIG. 3 illustrates a data center 300 that is configured to provide computing resources to users 300a, 300b, or 300c (which may be referred herein singularly as "a user 300" or in the plural as "the users 300") via user computers 303a, 303b, and 303c (which may be referred herein singularly as "a computer 303" or in the plural as "the computers 303") via a communications network 330. The computing resources provided by the data center 300 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 300 may correspond to service provider 100 in FIGS. 1 and 2, or edge site 150 of FIG. 2. Data center 300 may include servers 336a, 336b, and 336c (which may be referred to herein singularly as "a server 336" or in the plural as "the servers 336") that may be standalone or installed in server racks, and provide computing resources available as virtual machines 338a and 338b (which may be referred to herein singularly as "a virtual machine 338" or in the plural as "the virtual machines 338"). The virtual machines 338 may be configured to execute applications such as Web servers, application servers, media servers, database servers, and the like. Other resources that may be provided include data storage resources (not shown on FIG. 3) and may include file storage devices, block storage devices, and the like. Servers 336 may also execute functions that manage and control allocation of resources in the data center, such as a controller 335. Controller 335 may be a fabric controller or another type of program configured to manage the allocation of virtual machines on servers 336.

Referring to FIG. 3, communications network 330 may, for example, be a publicly accessible network of linked networks and may be operated by various entities, such as the Internet. In other embodiments, communications network 330 may be a private network, such as a corporate network that is wholly or partially inaccessible to the public.

Communications network 330 may provide access to computers 303. Computers 303 may be computers utilized by users 300. Computer 303a, 303b or 303c may be a server, a desktop or laptop personal computer, a tablet computer, a smartphone, a set-top box, or any other computing device capable of accessing data center 300. User computer 303a or 303b may connect directly to the Internet (e.g., via a cable modem). User computer 303c may be internal to the data center 300 and may connect directly to the resources in the data center 300 via internal networks. Although only three user computers 303a, 303b, and 303c are depicted, it should be appreciated that there may be multiple user computers.

Computers 303 may also be utilized to configure aspects of the computing resources provided by data center 300. For example, data center 300 may provide a Web interface through which aspects of its operation may be configured through the use of a Web browser application program executing on user computer 303. Alternatively, a stand-alone application program executing on user computer 303 may be used to access an application programming interface (API) exposed by data center 300 for performing the configuration operations.

Servers 336 may be configured to provide the computing resources described above. One or more of the servers 336 may be configured to execute a manager 330a or 330b (which may be referred herein singularly as "a manager 330" or in the plural as "the managers 330") configured to execute the virtual machines. The managers 330 may be a virtual machine monitor (VMM), fabric controller, or another type of program configured to enable the execution of virtual machines 338 on servers 336, for example.

It should be appreciated that although the embodiments disclosed above are discussed in the context of virtual machines, other types of implementations can be utilized with the concepts and technologies disclosed herein.

In the example data center 300 shown in FIG. 3, a network device 333 may be utilized to interconnect the servers 336a and 336b. Network device 333 may comprise one or more switches, routers, or other network devices. Network device 333 may also be connected to gateway 340, which is connected to communications network 330. Network device 333 may facilitate communications within networks in data center 300, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 3 has been greatly simplified and that many more networks and networking devices may be utilized to interconnect the various computing systems disclosed herein. These network topologies and devices should be apparent to those skilled in the art.

It should also be appreciated that data center 300 described in FIG. 3 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 4:
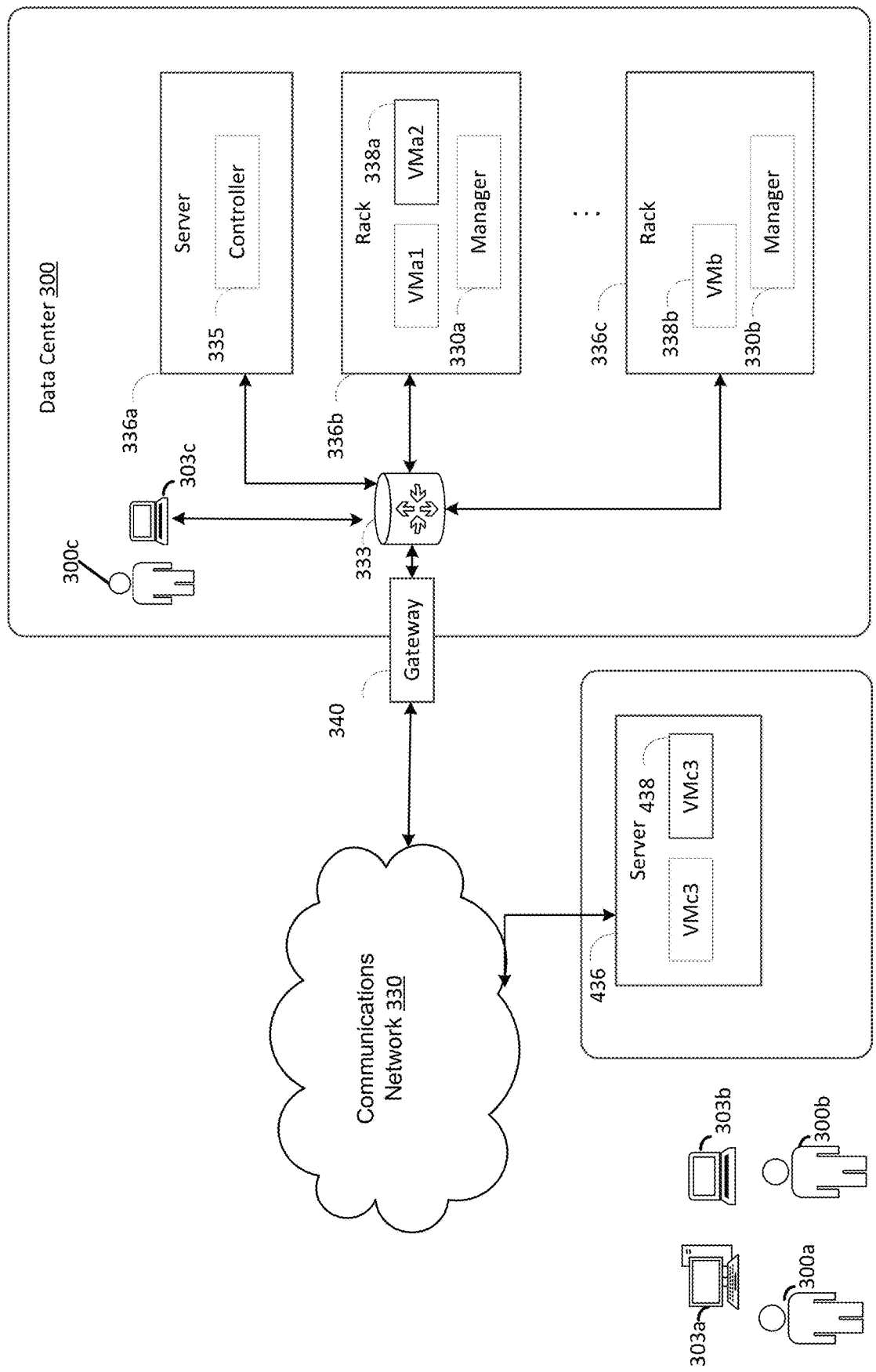
FIG. 4 is a diagram illustrating a data center and local resources in accordance with the present disclosure.

FIG. 4 illustrates an example computing environment illustrating integration of computing resources that include an edge site 420 that is geographically proximate to a facility local to users 300, in accordance with the present disclosure. In one embodiment, one or more servers 436 may be installed at the edge site 420. In an embodiment, servers 436 instantiate and run virtual machines 438.

In some embodiments, users 300 may specify configuration information for a virtual network to be provided for the user, with the configuration information optionally including a variety of types of information such as network addresses to be assigned to computing endpoints of the provided computer network, network topology information for the provided computer network, network access constraints for the provided computer network. The network addresses may include, for example, one or more ranges of network addresses, which may correspond to a subset of virtual or private network addresses used for the user's private computer network. The network topology information may indicate, for example, subsets of the computing endpoints to be grouped together, such as by specifying networking devices to be part of the provided computer network, or by otherwise indicating subnets of the provided computer network or other groupings of the provided computer network. The network access constraint information may indicate, for example, for each of the provided computer network's computing endpoints, which other computing endpoints may intercommunicate with the computing node endpoint, or the types of communications allowed to/from the computing endpoints.

Figure 5A:
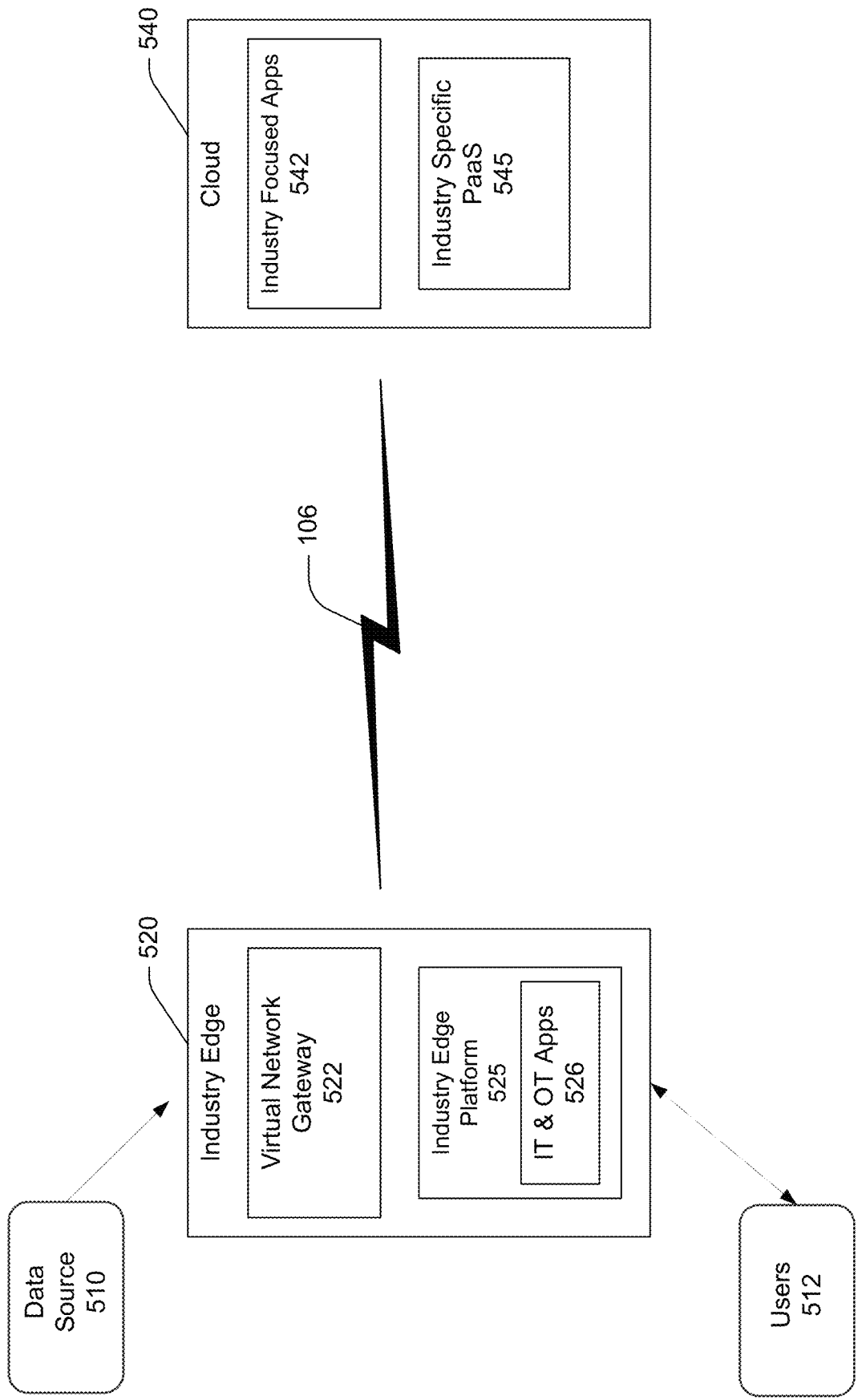
FIG. 5A is a diagram illustrating an architecture for providing industry edge services in accordance with the present disclosure.

With reference to FIG. 5A, illustrated is one example architecture for providing industry edge services in accordance with the present disclosure. In an embodiment, the architecture may include an on-site industry edge 520 that includes a virtual network gateway 522. The industry edge 520 may include an industry edge platform 525 running applications 526. In an embodiment, the architecture may include a cloud node 540. The cloud node 540 may include resources such as industry specific PaaS 545 and industry specific applications 542. Data source 510 may provide data for consumption.

Figure 5B:
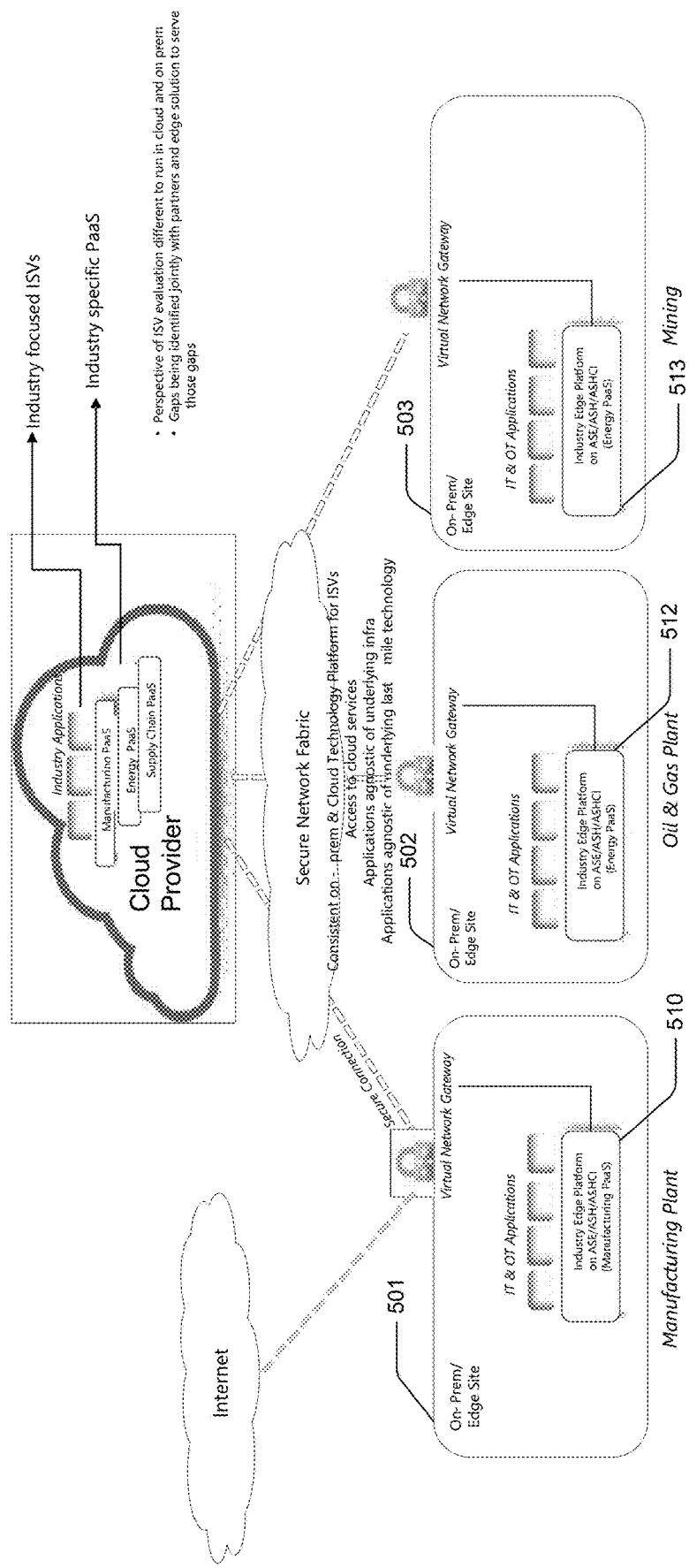
FIG. 5B is a diagram illustrating an architecture for providing industry edge services in accordance with the present disclosure.

With reference to FIG. 5B, illustrated is one example architecture for providing industry edge services in accordance with the present disclosure. In an embodiment, the architecture may include edge platforms at edge sites at a manufacturing plant 501, oil and gas plant 502, and mining location 503, for example. The edge platform may provide industry specific PaaS and other services while receiving input sensor and control data. The edge platform may provide a consistent on-premise and cloud technology platform for various ISV applications as well as access to cloud services. The edge platform may also provide applications that are agnostic of the underlying infrastructure and that are agnostic of the underlying last mile technology. The cloud provider may orchestrate the management and provisioning of services as well as analytics and other applications.

Figure 5C:
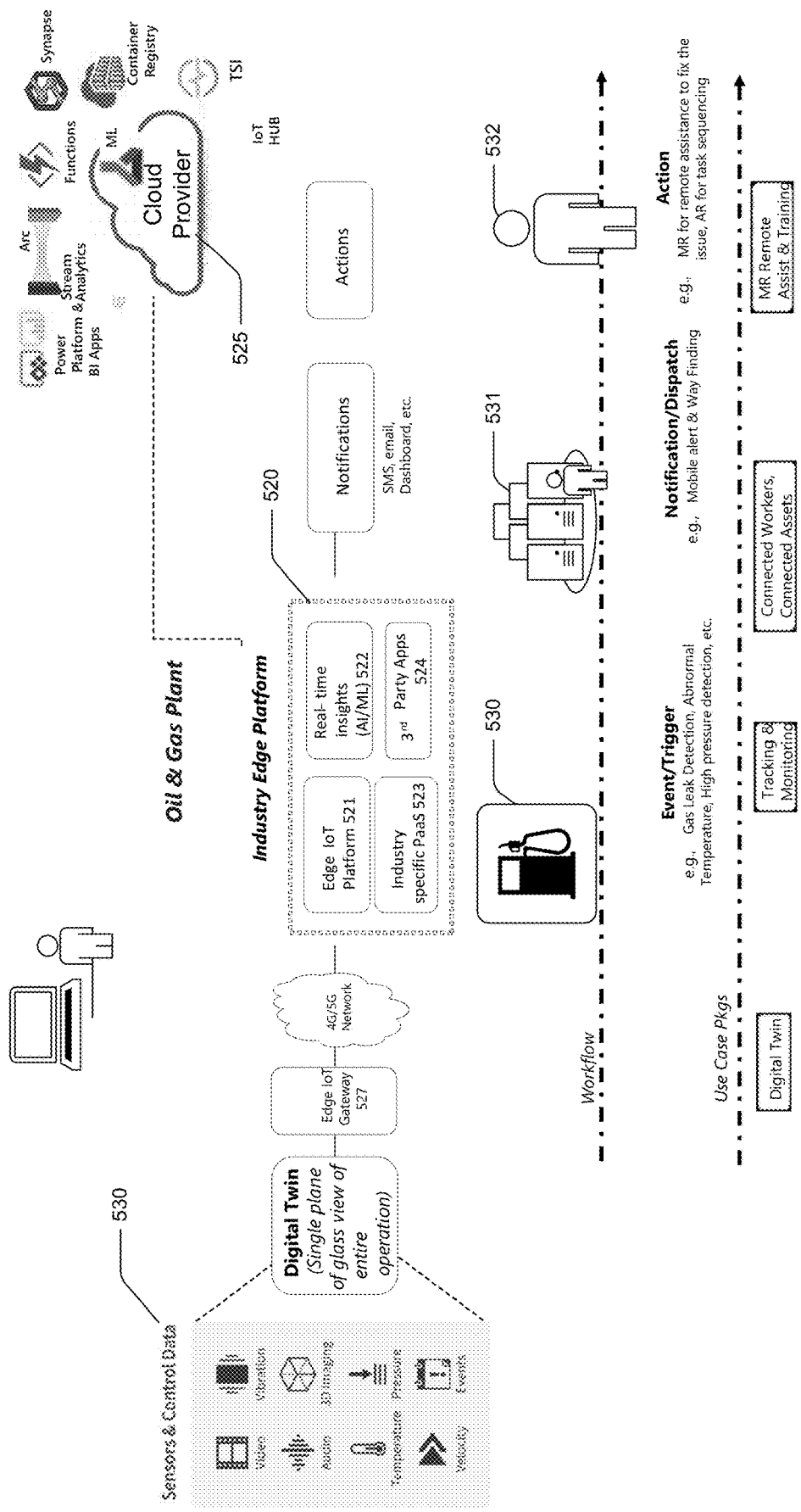
FIG. 5C is a diagram illustrating an architecture for providing industry edge services in accordance with the present disclosure.

With reference to FIG. 5C, illustrated is one example architecture for providing industry edge services in an oil and gas plant scenario, in accordance with the present disclosure. In an embodiment, the architecture may include an industry edge platform 520 at an edge site that may provide, for example, an edge platform and other services. The industry edge platform may include an edge IoT platform 521, a real-time insights function using AI and ML 522, industry specific PaaS 523, and third-party applications 524. The industry edge platform 520 may provide workflow and other services while receiving input sensor and control data 530. The cloud provider 525 may orchestrate the management and provisioning of services as well as analytics and other applications. In one embodiment, an edge IoT gateway 527 may be provided with protocol converters. In some embodiments, metadata may be added to detected events such as a gas leak. The added metadata may include location information for the sensor, which can be automatically included in workflows, for example for sending the event notification by email to enable guidance to the location. Other such automated flows can be enabled.

Figure 5D:
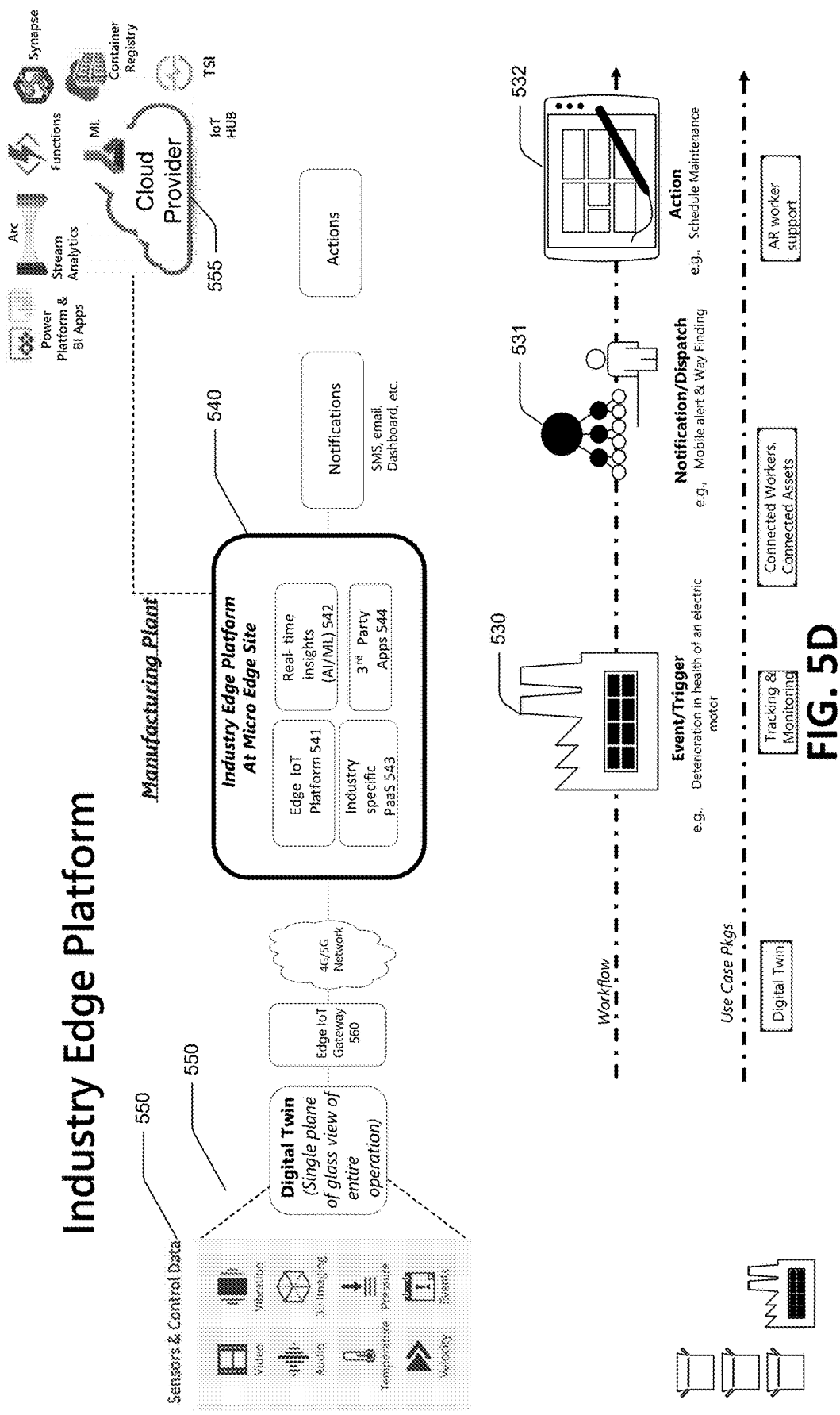
FIG. 5D is a diagram illustrating an architecture for providing industry edge services in accordance with the present disclosure.

With reference to FIG. 5D, illustrated is one example architecture for providing industry edge services in a manufacturing plant scenario, in accordance with the present disclosure. In an embodiment, the architecture may include an industry edge platform 540 at an edge site that may provide, for example, an edge platform and other services. The industry edge platform may include an edge IoT platform 541, a real-time insights function using AI and ML 542, industry specific PaaS 543, and third-party applications 544. The industry edge platform 540 may provide workflow and other services while receiving input sensor and control data 550. The cloud provider 555 may orchestrate the management and provisioning of services as well as analytics and other applications. In one embodiment, an edge IoT gateway 560 may be provided with protocol converters. In some embodiments, metadata may be added to detected events such as the deterioration in health of an electric motor. The added metadata may include location information for the motor, which can be automatically included in workflows, for example for sending the event notification by email to enable guidance to the location of the event/failure. Other such automated flows can be enabled.

Figure 6:
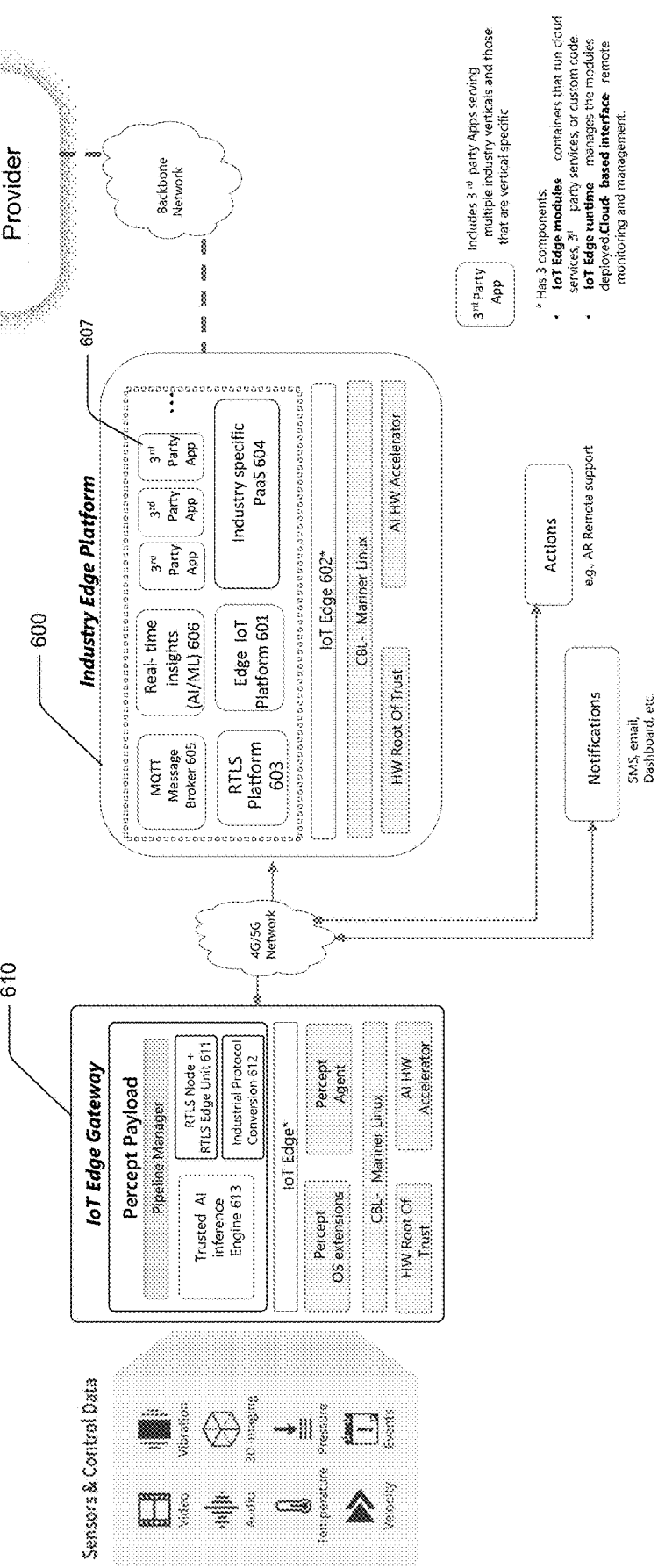
FIG. 6 is a diagram illustrating an architecture for managing resources in accordance with the present disclosure.

With reference to FIG. 6, illustrated is one example architecture for providing industry edge services, in accordance with the present disclosure. In an embodiment, the architecture may include an industry edge platform 600 that may be deployed at an edge site that may provide, for example, an edge platform and other services. The industry edge platform 600 may include an edge IoT layer 602 that may include IoT edge modules that are containers that run cloud services, third party services, or custom code. The edge IoT layer 602 may further include an edge IoT runtime that manages the deployed modules. The edge IoT layer 602 may also include a cloud-based interface for remote monitoring and management.

The industry edge platform 600 may include a RTLS platform 603, edge IoT platform 601, industry specific PaaS 604, message broker 605, and real-time insights 606 using AI and ML, and third-party applications 607. The third-party applications 607 may include applications serving multiple industry verticals and those that are vertical specific. The edge platform may provide workflow and other services while receiving input sensor and control data. FIG. 6 also illustrates an IoT edge gateway 610 that includes a real time location service (RTLS) node and RTLS edge unit 611. The IoT edge gateway 610 may also include industry protocol conversion logic 612. An inference engine 613 may be included to generate real time insights for analysis and contextualization based on input data. The disclosed industry edge services hybrid architecture provide consistency as well as flexibility for edge services that provide simplicity and efficiency while bringing edge capabilities to industries.

Figure 7:
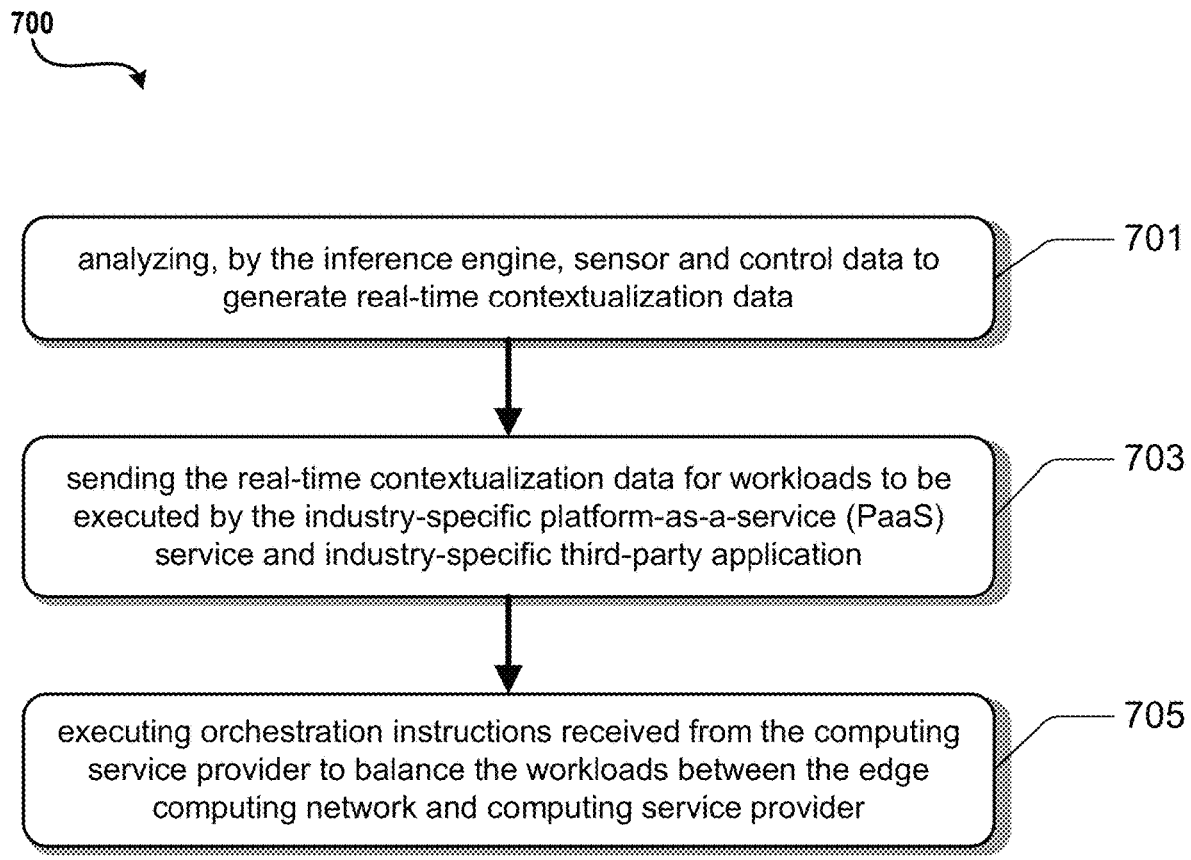
FIG. 7 is a flowchart depicting an example procedure for providing industry edge in accordance with the present disclosure.

Turning now to FIG. 7, illustrated is an example operational procedure for providing an industry edge service in accordance with the present disclosure. Such an operational procedure can be provided by one or more components illustrated in FIGS. 1 through 6. The operational procedure may be implemented in a computing environment comprising a computing service provider and an edge computing network. The edge computing network may comprise computing and storage devices configured to extend computing resources of the computing service provider to remote users of the computing service provider. The edge computing network may be configured with a standardized platform for applications and services to be provided at the edge computing network. In an embodiment, the standardized platform may execute:

an industry-specific platform-as-a-service (PaaS) service configured to provide an application platform for a targeted industry;

one or more industry-specific third-party applications configured for the industry-specific PaaS; and an inference engine configured to analyze industry-specific input data;

In an embodiment:

the edge computing network may be communicatively coupled to an IoT edge gateway configured to perform protocol conversion for the targeted industry, and the standardized platform of the edge computing network may be configured for enabling execution of the industry specific PaaS services and industry specific third-party applications.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 700 is described as running on a system, it can be appreciated that the routine 700 and other operations described herein can be executed on an individual computing device or several devices.

Referring to FIG. 7, operation 701 illustrates analyzing, by the inference engine, sensor and control data to generate real-time contextualization data.

Operation 701 may be followed by operation 703. Operation 703 illustrates sending the real-time contextualization data for workloads to be executed by the industry-specific platform-as-a-service (PaaS) service and industry-specific third-party application.

Operation 703 may be followed by operation 705. Operation 705 illustrates executing orchestration instructions received from the computing service provider to balance the workloads between the edge computing network and computing service provider.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Figure 8:
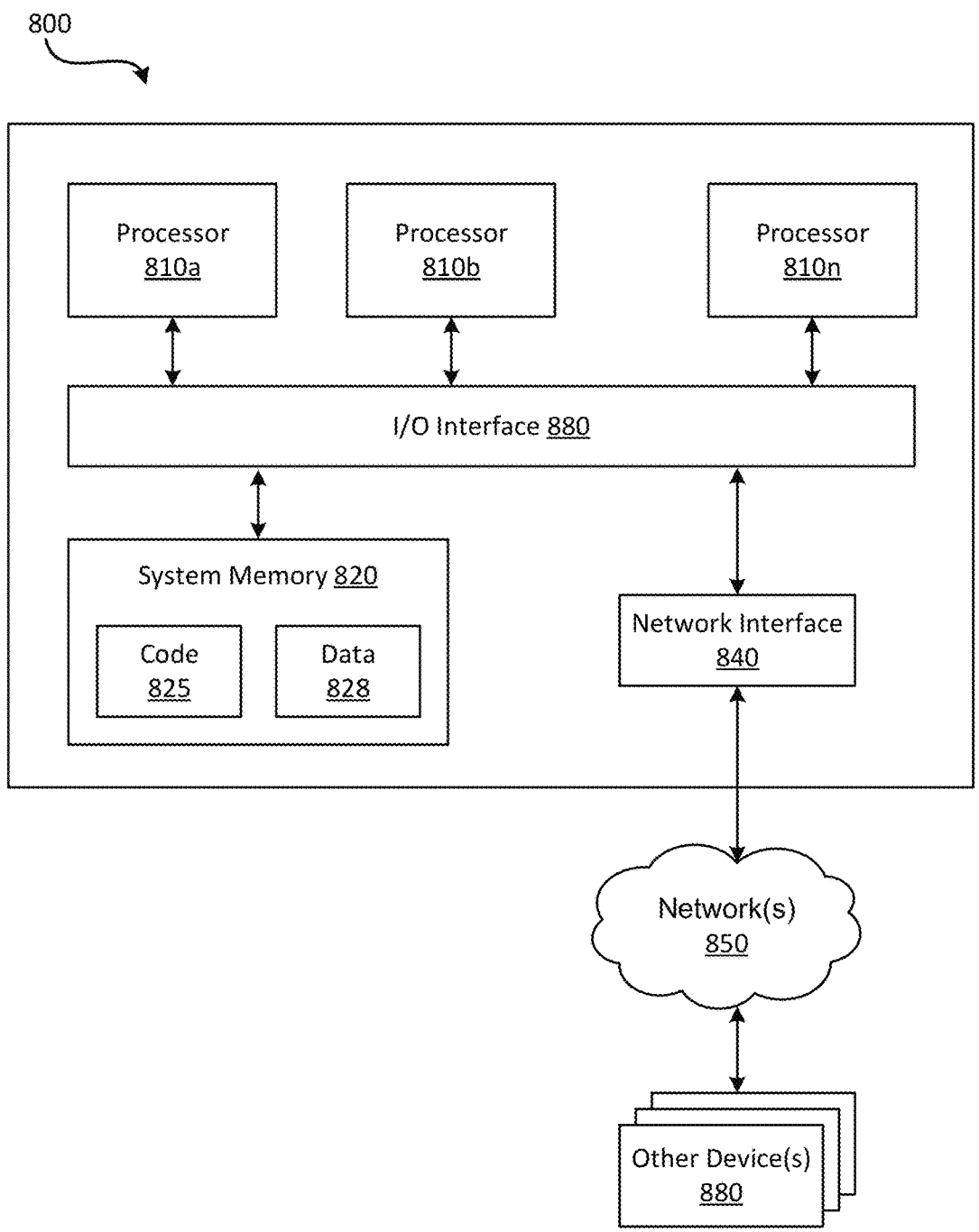
FIG. 8 is an example computing system in accordance with the present disclosure.

FIG. 8 illustrates a general-purpose computing device 800. In the illustrated embodiment, computing device 800 includes one or more processors 810a, 810b, and/or 810n (which may be referred herein singularly as "a processor 810" or in the plural as "the processors 810") coupled to a system memory 88 via an input/output (I/O) interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x88, PowerPC, SPARC, or MIPS ISAs, or any other suitable ISA. In multiprocessor systems, each of processors 810 may commonly, but not necessarily, implement the same ISA.

System memory 88 may be configured to store instructions and data accessible by processor(s) 810. In various embodiments, system memory 88 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 820 as code 825 and data 828.

In one embodiment, I/O interface 830 may be configured to coordinate I/O traffic between the processor 810, system memory 88, and any peripheral devices in the device, including network interface 840 or other peripheral interfaces. In some embodiments, I/O interface 830 may perform any necessary protocol, timing, or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components. Also, in some embodiments some or all of the functionality of I/O interface 830, such as an interface to system memory 820, may be incorporated directly into processor 810.

Network interface 840 may be configured to allow data to be exchanged between computing device 800 and other device or devices 880 attached to a network or network(s) 880, such as other computer systems or devices as illustrated in FIGS. 1 through 5, for example. In various embodiments, network interface 840 may support communication via any suitable wired or wireless general data networks, such as types of Ethernet networks, for example. Additionally, network interface 840 may support communication via telecommunications/telephony networks such as analog voice networks or digital fiber communications networks, via storage area networks such as Fibre Channel SANs or via any other suitable type of network and/or protocol.

In some embodiments, system memory 820 may be one embodiment of a computer-accessible medium configured to store program instructions and data as described above for FIGS. 1-7 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 800 as system memory 820 or another type of memory. Further, a computer-accessible medium may include transmission media or signals such as electrical, electromagnetic or digital signals, conveyed via a communication medium such as a network and/or a wireless link, such as may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 8, or may utilize an architecture completely different than that shown in FIG. 8.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

In an embodiment:

A system for providing computing resources in a computing environment comprising a computing service provider and an edge computing network, the edge computing network comprising computing and storage devices configured to extend computing resources of the computing service provider to remote users of the computing service provider, the system comprising:

an industry edge platform executing industry specific PaaS services and industry specific third-party applications, the industry edge platform further including an IoT edge service; and an IoT edge gateway configured to perform protocol conversion and an inference engine configured to analyze sensor and control data to generate real-time contextualization;

wherein:

the industry edge platform is communicatively coupled to the computing service provider and configured to receive orchestration instructions from the computing service provider; and the industry edge platform is configured with a standardized platform for enabling execution of the industry specific PaaS services and industry specific third-party applications.

The disclosure presented herein also encompasses the subject matter set forth in the following clauses:

Clause 1: A method for providing computing resources in a computing environment comprising a computing service provider and an edge computing network, the edge computing network comprising computing and storage devices configured to extend computing resources of the computing service provider to remote users of the computing service provider, the edge computing network configured with a standardized platform for applications and services to be provided at the edge computing network, the standardized platform executing:

an industry-specific platform-as-a-service (PaaS) service configured to provide an application platform for a targeted industry;

one or more industry-specific third-party applications configured for the industry-specific PaaS; and an inference engine configured to analyze industry-specific input data;

wherein:

the edge computing network is communicatively coupled to an IoT edge gateway configured to perform protocol conversion for the targeted industry, and the standardized platform of the edge computing network is configured for enabling execution of the industry specific PaaS services and industry specific third-party applications;

the method comprising:

analyzing, by the inference engine, sensor and control data to generate real-time contextualization data;

sending the real-time contextualization data for workloads to be executed by the industry-specific platform-as-a-service (PaaS) service and industry-specific third-party application; and executing orchestration instructions received from the computing service provider to balance the workloads between the edge computing network and computing service provider.

Clause 2: The method of clause 1, wherein the workloads are for a processing pipeline that has been partitioned into workflows, wherein the workflows can be executed at the computing service provider or the industry edge platform.

Clause 3: The method of any of clauses 1-2, further comprising executing on the edge computing network, an Internet of Things (IoT) edge service.

Clause 4: The method of any of clauses 1-3, further comprising sending, to the industry edge platform, instructions for workflows to be executed at the industry edge platform.

Clause 5: The method of any of clauses 1-4, wherein the industry edge platform is configured to communicatively couple to the computing service provider over a 5G network.

Clause 6: The method of any of clauses 1-5, further comprising:

generating metadata for selected events; and automatically including the metadata in the workflows.

Clause 7: The method of clauses 1-6, further comprising distributing the instructed workflows within the computing resources at the edge computing network.

Clause 8: The method of any of clauses 1-7, wherein the real-time contextualization data is based on industry-specific analysis of the sensor and control data.

Clause 9: A system for providing computing resources in a computing environment comprising a computing service provider and an edge computing network, the edge computing network comprising computing and storage devices configured to extend computing resources of the computing service provider to remote users of the computing service provider, the system comprising:

one or more processors; and a memory in communication with the one or more processors, the memory having computer-readable instructions stored thereupon that, when executed by the one or more processors, cause the system to instantiate a standardized platform for applications and services to be provided at the edge computing network, the standardized platform configured to execute industry specific PaaS services and industry specific third-party applications, and an IoT edge service;

the system further comprising an IoT edge gateway configured to perform protocol conversion; wherein:

the system is communicatively coupled to the computing service provider and configured to receive orchestration instructions from the computing service provider.

Clause 10: The system of clause 9, further comprising computer-readable instructions stored thereupon that, when executed by the one or more processors, cause the system to execute workloads for a processing pipeline that has been partitioned into the workloads.

Clause 11: The system of any of clauses 9 and 10, wherein the workloads can be executed at the computing service provider or the edge computing network.

Clause 12: The system of any clauses 9-11, further comprising sending, to the edge computing network, instructions for workloads to be executed at the edge computing network.

Clause 13: The system of any clauses 9-12, wherein the system is configured to communicatively couple to the computing service provider over a 5G network.

Clause 14: A computer-readable storage medium having computer-executable instructions stored thereupon which, when executed by one or more processors of a computing device, cause the computing device to:

instantiate a standardized edge platform for applications and services to be provided at an edge computing network, the standardized edge platform configured to execute industry specific PaaS services and industry specific third-party applications in a computing environment comprising a computing service provider and an edge computing network, the edge computing network comprising computing and storage devices configured to extend computing resources of the computing service provider to remote users of the computing service provider;

analyze sensor and control data to generate real-time contextualization data;

send the real-time contextualization data for workloads to be executed by the PaaS services and industry-specific third-party applications; and execute orchestration instructions received from the computing service provider to balance the workloads between the edge computing network and computing service provider.

Clause 15: The computer-readable storage medium of clause 14, further comprising computer-executable instructions stored which, when executed by one or more processors of a computing device, cause the computing device to execute workloads for a processing pipeline that has been partitioned into the workloads.

Clause 16: The computer-readable storage medium of any of clauses 14 and 15, wherein the workloads can be executed at the computing service provider or the edge computing network.

Clause 17: The computer-readable storage medium of any of the clauses 14-16, the workloads are distributed within the computing resources at the edge computing network.

Clause 18: The computer-readable storage medium of any of the clauses 14-17, further comprising computer-executable instructions stored which, when executed by one or more processors of a computing device, cause the computing device to communicate with an IoT edge service.

Clause 19: The computer-readable storage medium of any of the clauses 14-18, further comprising computer-executable instructions stored which, when executed by one or more processors of a computing device, cause the computing device to:
  generate metadata for selected events; and
  automatically include the metadata in workflows.

Clause 20: The computer-readable storage medium of any of the clauses 14-19, further comprising computer-executable instructions stored which, when executed by one or more processors of a computing device, cause the computing device to communicate with an IoT edge gateway configured to perform protocol conversion.

The invention claimed is:

1. A method for providing computing resources in a computing environment comprising a computing service provider and an edge computing network, the edge computing network comprising computing and storage devices configured to extend computing resources of the computing service provider to remote users of the computing service provider, the edge computing network configured with a standardized platform for applications and services to be provided at the edge computing network, the standardized platform executing:
  an industry-specific platform-as-a-service (PaaS) service configured to provide an application platform for a targeted industry;
  one or more industry-specific third-party applications configured for the industry-specific PaaS; and
  an inference engine configured to analyze industry-specific input data;
  wherein:
    the edge computing network is communicatively coupled to an IoT edge gateway configured to perform protocol conversion for the targeted industry, and
    the standardized platform of the edge computing network is configured for enabling execution of the industry specific PaaS services and industry specific third-party applications;
  the method comprising:
  analyzing, by the inference engine, sensor and control data to generate real-time contextualization data;
  sending the real-time contextualization data for workloads to be executed by the industry-specific platform-as-a-service (PaaS) service and industry-specific third-party application;
  executing orchestration instructions received from the computing service provider to balance the workloads between the edge computing network and computing service provider;
  wherein the workloads are for a processing pipeline that has been partitioned into workflows, wherein the workflows can be executed at the computing service provider or the industry edge platform;
  generating metadata for selected events that are detected by sensors at the edge computing network, the metadata including location information for the sensors; and
  automatically including the metadata in workflows for the workloads.

2. The method of claim 1, further comprising executing on the edge computing network, an Internet of Things (IoT) edge service.

3. The method of claim 1, further comprising sending, to the industry edge platform, instructions for workflows to be executed at the industry edge platform.

4. The method of claim 1, wherein the industry edge platform is configured to communicatively couple to the computing service provider over a 5G network.

5. The method of claim 3, further comprising distributing the instructed workflows within the computing resources at the edge computing network.

6. The method of claim 1, wherein the real-time contextualization data is based on industry-specific analysis of the sensor and control data.

7. The method of claim 1, further comprising sending an event notification to enable guidance to the location indicated in the metadata in response to an event or failure.

8. A system for providing computing resources in a computing environment comprising a computing service provider and an edge computing network, the edge computing network comprising computing and storage devices configured to extend computing resources of the computing service provider to remote users of the computing service provider, the system comprising:
  one or more processors; and
  a memory in communication with the one or more processors, the memory having computer-readable instructions stored thereupon that, when executed by the one or more processors, cause the system to instantiate a standardized platform for applications and services to be provided at the edge computing network, the standardized platform configured to:
  execute industry specific PaaS services and industry specific third-party applications, and an IoT edge service;
  execute workloads for a processing pipeline that has been partitioned into the workloads;
  generating metadata for selected events that are detected by sensors at the edge computing network, the metadata including location information for the sensors; and
  automatically including the metadata in workflows for the workloads;
  the system further comprising an IoT edge gateway configured to perform protocol conversion; wherein:
  the system is communicatively coupled to the computing service provider and configured to receive orchestration instructions from the computing service provider.

9. The system of claim 8, wherein the workloads can be executed at the computing service provider or the edge computing network.

10. The system of claim 8, further comprising sending, to the edge computing network, instructions for workloads to be executed at the edge computing network.

11. The system of claim 8, wherein the system is configured to communicatively couple to the computing service provider over a 5G network.

12. The system of claim 8, wherein the standardized platform is further configured to send an event notification to enable guidance to the location indicated in the metadata in response to an event or failure.

13. A non-transitory computer-readable storage medium having computer-executable instructions stored thereupon which, when executed by one or more processors of a computing device, cause the computing device to:
  instantiate a standardized edge platform for applications and services to be provided at an edge computing network, the standardized edge platform configured to execute industry specific PaaS services and industry specific third-party applications in a computing environment comprising a computing service provider and an edge computing network, the edge computing network comprising computing and storage devices configured to extend computing resources of the computing service provider to remote users of the computing service provider;

analyze sensor and control data to generate real-time contextualization data;

send the real-time contextualization data for workloads to be executed by the PaaS services and industry-specific third-party applications;

execute orchestration instructions received from the computing service provider to balance the workloads between the edge computing network and computing service provider;

execute workloads for a processing pipeline that has been partitioned into the workloads;

generate metadata for selected events that are detected by sensors at the edge computing network, the metadata including location information for the sensors; and automatically include the metadata in workflows for the workloads.

14. The non-transitory computer-readable storage medium of claim 13, wherein the workloads can be executed at the computing service provider or the edge computing network.

15. The non-transitory computer-readable storage medium of claim 13, the workloads are distributed within the computing resources at the edge computing network.

16. The non-transitory computer-readable storage medium of claim 13, further comprising computer-executable instructions stored which, when executed by one or more processors of a computing device, cause the computing device to communicate with an IoT edge service.

17. The non-transitory computer-readable storage medium of claim 13, further comprising computer-executable instructions stored which, when executed by one or more processors of a computing device, cause the computing device to communicate with an IoT edge gateway configured to perform protocol conversion.

18. The non-transitory computer-readable storage medium of claim 13, further comprising computer-executable instructions stored thereupon which, when executed by one or more processors of a computing device, cause the computing device to send an event notification to enable guidance to the location indicated in the metadata in response to an event or failure.

* * * * *